United States Patent [19]
Meeks

[11] Patent Number: 5,472,341
[45] Date of Patent: Dec. 5, 1995

[54] BURNER HAVING LOW POLLUTANT EMISSIONS

[76] Inventor: Thomas Meeks, 25590 Pospect Ave. #35B, Loma Linda, Calif. 92354

[21] Appl. No.: 252,263

[22] Filed: Jun. 1, 1994

[51] Int. Cl.⁶ .................................................. F23D 11/44
[52] U.S. Cl. .......................... 431/243; 431/11; 431/244; 431/354
[58] Field of Search ............................ 431/11, 243, 355, 431/242, 244, 354

[56] References Cited

U.S. PATENT DOCUMENTS

| | | | |
|---|---|---|---|
| 462,685 | 11/1891 | Bayce | 431/355 |
| 694,746 | 3/1902 | Hanna | 431/355 |
| 715,300 | 12/1902 | Schaefer | 431/355 |
| 765,509 | 7/1904 | Oberwalder | 431/355 |
| 991,141 | 5/1911 | DeForest | 431/354 |
| 1,441,062 | 1/1923 | Campbell | 431/243 |
| 1,460,630 | 7/1923 | Wiederwax | 431/243 |
| 1,460,631 | 7/1923 | Wiederwax | 431/243 |
| 1,570,683 | 1/1926 | Kohn | 431/355 |
| 1,629,909 | 5/1927 | Fish | 431/243 |
| 2,450,790 | 10/1948 | Greaves | 437/355 |
| 3,840,321 | 10/1974 | Moleneh | 431/243 X |
| 3,925,002 | 12/1975 | Verdouw | 431/11 X |
| 4,008,038 | 2/1977 | Berthiaume | 431/11 |
| 4,213,501 | 7/1980 | Pfeiffer et al. | 169/242 X |
| 4,255,116 | 3/1981 | Zwick | 431/11 |
| 4,443,180 | 4/1984 | LeGrois | 431/242 X |
| 4,661,057 | 4/1987 | Pearl, II et al. | 431/243 |
| 4,946,384 | 8/1990 | London | 431/354 |
| 4,968,244 | 11/1990 | Movassaghi | 431/354 X |
| 5,295,817 | 3/1994 | Young | 431/11 |

FOREIGN PATENT DOCUMENTS

| | | | |
|---|---|---|---|
| 1079952 | 3/1984 | U.S.S.R. | 431/11 |

*Primary Examiner*—Larry Jones
*Attorney, Agent, or Firm*—Joseph F. McLellan

[57] ABSTRACT

A burner capable of burning low pressure combustible gas with minimum pollutant emissions. The gas is preheated to hydrocarbon cracking temperatures in a heat exchanger located directly within an elongated water jacketed combustion chamber of the burner. The heated, expanding and rapidly flowing gas from the heat exchanger passes through a nozzle to further accelerate the gas for passage into an air intake system together with aspirated air. The nozzle and intake system are adjustable to meter in proper amounts of gas and air for a stoichiometric mixture. The gas/air mixture is laterally directed into the combustion chamber to induce turbulence and continued mixing for optimum ignition and burning. The resulting heated gases are useful in various end applications, such as in steam generating boilers. The burner is also adapted to inject steam into the preheated gas or into the intake system or into both to increase mass flow of air and to promote low pollutant emissions.

29 Claims, 3 Drawing Sheets

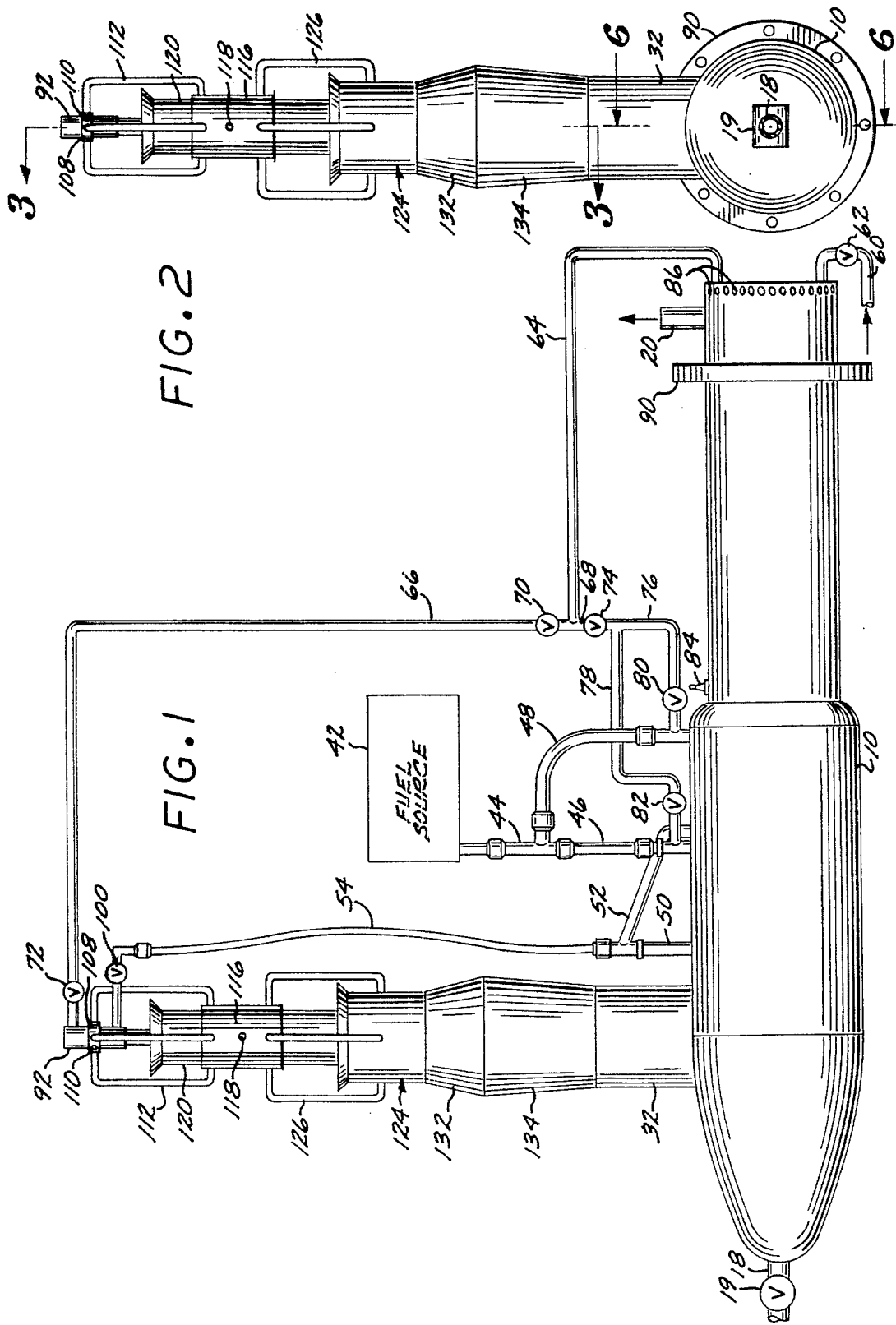

BURNER HAVING LOW POLLUTANT EMISSIONS

BACKGROUND OF THE INVENTION

1. Field of the Invention

The present invention relates to a burner in which the fuel is preheated to relatively high temperatures in a heat exchanger located in a water jacketed burner combustion chamber, the burner also being characterized by intimate mixing of the preheated fuel with naturally aspirated air to produce a stoichiometric mixture whose combustion produces minimum pollutant emissions.

2. Description of the Prior Art

Conventional burners for steam generation boilers and other end applications are generally characterized by high pollutant exhaust emissions, and particularly high levels of nitrogen oxide and carbon monoxide. This is primarily because of incomplete combustion. More stringent emissions standards and thermal efficiency requirements have brought great pressure on the burner industry to either improve or phase out such outmoded burners.

Natural gas, methane and propane are typically used in such burners. Natural gas is preferred, but it is only available from most distribution systems at relatively low pressure. Prior art burners have therefore had to use fuel pumps or compressors to increase the fuel pressure necessary for steady state burning.

In addition, the combustion temperatures which characterize most prior art burners are relatively low because of the susceptibility of such burners to thermal breakdown or actual melting at the higher temperatures which produce more complete combustion and consequently lower pollutant exhaust emissions.

Also, prior art burners have been deficient in failing to provide the turbulent and thorough mixing of fuel and air necessary to achieve complete combustion.

SUMMARY OF THE INVENTION

According to the present invention, a burner is provided which is characterized by low pollutant emissions, and particularly by low levels of nitrogen oxide and carbon monoxide. This is achieved by intimate mixing of proper proportions of fuel and air at temperatures sufficiently elevated that dissociation or cracking of the hydrocarbons in the fuel occurs. The ideal temperature range is between 1730 and 1835 degrees Fahrenheit.

In the present burner the fuel is passed through a heat exchanger which is placed directly within the burner combustion chamber where temperatures reach as high as 2700 degrees F. A water jacket around the combustion chamber cools the chamber walls so that they do not develop hot spots or otherwise suffer from thermal failure.

The preheated fuel is carried by means of an insulated conduit from the combustion chamber heat exchanger to an air intake system having a fuel entry nozzle through which the expanding, rapidly flowing preheated fuel is directed.

When methane is one of the fuel components, it is known that at temperatures above 850 degrees F. the carbon in the methane will act as a catalyst in the presence of steam to convert the steam into hydrogen and carbon dioxide, and that addition of as little as a five percent concentration of hydrogen to the gas stream will result in an up to 20 percent reduction in pollutant emissions.

Furthermore, admission of steam into the fuel entry nozzle increases the mass flow of air through the air intake system, allowing operation of the burner at lower fuel inlet pressures and higher fuel volumes, and resulting in a higher BTU output without any resort to pumps or compressors. The normal delivery pressures in municipal natural gas distribution systems will thus be sufficient to operate the present burner.

Steam for these purposes can be provided by locating another heat exchanger in the combustion chamber downstream from the fuel preheater heat exchanger. The high temperature steam produced can then be selectively admitted into the stream of fuel passing into the fuel heat exchanger, or into the fuel entry nozzle.

The fuel entry nozzle rapidly accelerates fuel flow through the air intake system. The structure of the air intake is operative in the presence of the high velocity fuel stream to draw in or naturally aspirate air for mixture with the fuel.

The air intake structure can also be adjusted to control the amount of air aspirated. This, in conjunction with adjustment of the nozzle position, provides a means for precisely controlling the relative amounts of fuel and air necessary to achieve a stoichiometric mixture for clean, low pollution burning.

The high velocity flow of the mixture is admitted into the burner combustion chamber at an angle to the longitudinal direction of flow of the burning gases through the burner. This results in an extreme change of direction of the mixture flow so that high turbulence results, further improving the intermixture of the fuel with the air.

Other aspects and advantages of the present invention will become apparent from the following more detailed description taken in conjunction with the accompanying drawings.

BRIEF DESCRIPTION OF THE DRAWINGS

FIG. 1 is a side elevational view of the burner of the present invention, as it would appear when viewed separately of an end application device such as a steam generating boiler (not shown);

FIG. 2 is a left end elevational view of the burner of FIG. 1;

DESCRIPTION OF THE PREFERRED EMBODIMENT

Figure 3:
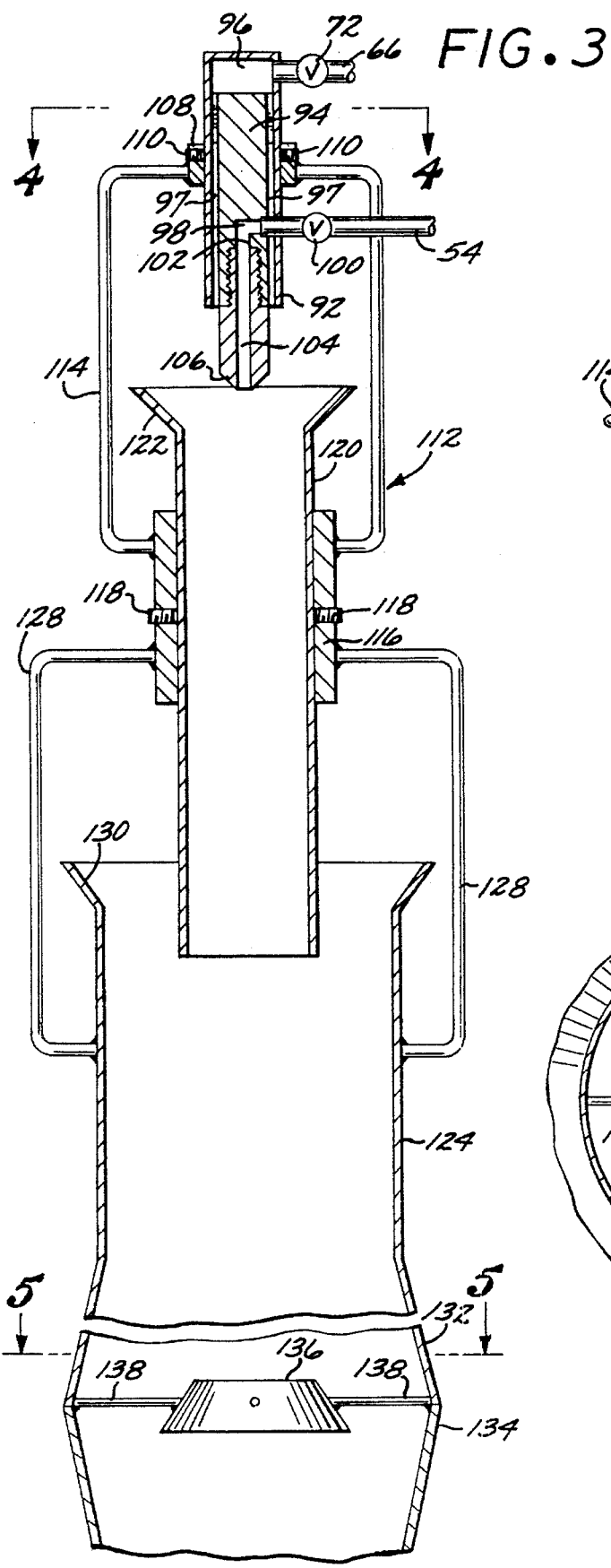
FIG. 3 is an enlarged view taken along the line 3—3 of FIG. 2.

Referring now to the drawings, there is illustrated a burner according to the present invention. All major components of the burner are preferably made of 321 stainless steel and comprise, generally, an elongated casing 10 having an outer jacket or shell 12 spaced apart from an inner jacket or shell 14 to define an annular space or cooling jacket 16 coextensive with the length of the casing 10. Cooling water enters the jacket through the upstream end of the casing through a water inlet 18 under the control of a valve 19. The water exits the jacket 16 at the downstream end of the casing through a water outlet 20 (FIG. 2).

The water is swirled or tangentially directed during the course of its flow along the length of the casing by a water directing means in the form of a continuous helical coil 22. This slows the water flow so as to promote heat transfer from the hot inner shell 14, and more smoothly distribute the cooling water over the surface of the shell 14. This avoids hot spots and thermal stressing during the combustion process, which can produce temperatures approaching 2700 degrees F.

The inner shell 14 defines an elongated combustion chamber 24 having an upstream region 26, a middle region 28 and a downstream region 30.

The casing 10 includes a laterally oriented fuel mixture inlet 32 for admitting a combustible mixture of fuel and air laterally into the upstream region 26 of the combustion chamber, that is, normal or at substantially a right angle relative to the longitudinal axis of the casing 10. This causes turbulent flow of the fuel/air mixture by reason of the abrupt change in direction of the mixture flow as it leaves the inlet 32 and enters the combustion chamber. The turbulence promotes the intimate mixing of fuel and air necessary to promote clean burning or combustion of the mixture.

A fuel preheater or fuel heat exchanger is located in the middle region 28 of the combustion chamber for the purpose of preheating the hydrocarbon fuel. Combustion chamber temperatures can reach 2700 degrees Fahrenheit. This has been found to be sufficient to raise the temperature of the fuel passing through the heat exchanger to between 1730 and 1835 degrees Fahrenheit, which is high enough to disassociate or crack the hydrocarbons in the fuel.

Although a single heat exchanger could be used, it is preferred to use a pair of side-by-side heat exchangers 34 and 36 which are each provided with fuel for preheating. This reduces the pressure drop which would be considerably higher if a larger single heat exchanger were used.

Each of the heat exchangers 34 and 36 takes the form of a continuous helical tube or coil whose turns are seated within continuous and complemental spiral channels provided in adjacent cylindrical retainers 38 and 40, respectively. The retainers are snugly fitted against or are attached to the inner surface of the inner shell 14. This arrangement prevents the helical coils from changing position under the high temperatures present in the combustion chamber.

Gases such as methane or propane can be used as fuel, but natural gas is preferred. Although natural gas is typically available at relative low supply pressures, the nature of operation of the present burner, as will be seen, compensates for this and provides fuel inlet pressures which can range between 1 and 60 psig and still achieve steady state burning.

Natural gas is carried from the source 42 (FIG. 1) by a fuel inlet line 44 which branches into two fuel inlet lines 46 and 48 coupled to the downstream ends of the coils of the heat exchangers 34 and 36, respectively. The opposite upstream ends of the coils are coupled to fuel outlet branch lines 50 and 52, respectively, which merge into a flexible, thermally insulated main fuel outlet line 54.

The line 54 is insulated to reduce the loss of heat from the extremely hot gas which is rapidly expanding and flowing at great velocity through the line 54.

It is usually advantageous to inject steam into the preheated natural gas. At temperatures in excess of 850 degrees F., this allows the methane in the natural gas fuel to act as a catalyst to convert the steam into hydrogen and carbon dioxide, and thereby greatly reduce pollutant emissions from the burner. In addition, steam injection increases the mass flow of air through the air intake system, which will be described below, allowing operation of the burner at lower fuel inlet pressures and higher fuel volumes. This achieves higher BTU output without the use of pumps, blowers or compressors. The arrangement also facilitates the use of natural gas at the typically lower supply pressures of municipal distribution systems.

High temperature steam is made available by using another heat exchanger 56 located in the downstream region 30 of the burner combustion chamber. The heat exchanger 56 preferably comprises a helical coil similar in configuration to the coils of the heat exchangers 34 and 36. It is held in position by a retainer 58 similar to the retainers 38 and 40 of the other heat exchangers.

The downstream end of the coil of the heat exchanger 56 is connected to a water supply line 60 under the control of a valve 62 (FIG. 1), and the other or upstream end of the coil is coupled to a steam outlet line 64.

The line 64 branches into two steam lines 66 and 68, the line 66 being flexible and extending to the inlet end of the air intake system. Steam flow through the line 66 is under the control of a valve 70 located adjacent the junction of the line 66 with the line 64, and a valve 72 located adjacent the inlet end of the air intake system.

Steam flow through the steam line 68 is under the control of a valve 74. Downstream of the valve 74 the steam line 68 branches into two steam lines 76 and 78 which are under the control of valves 80 and 82, respectively.

Figure 6:
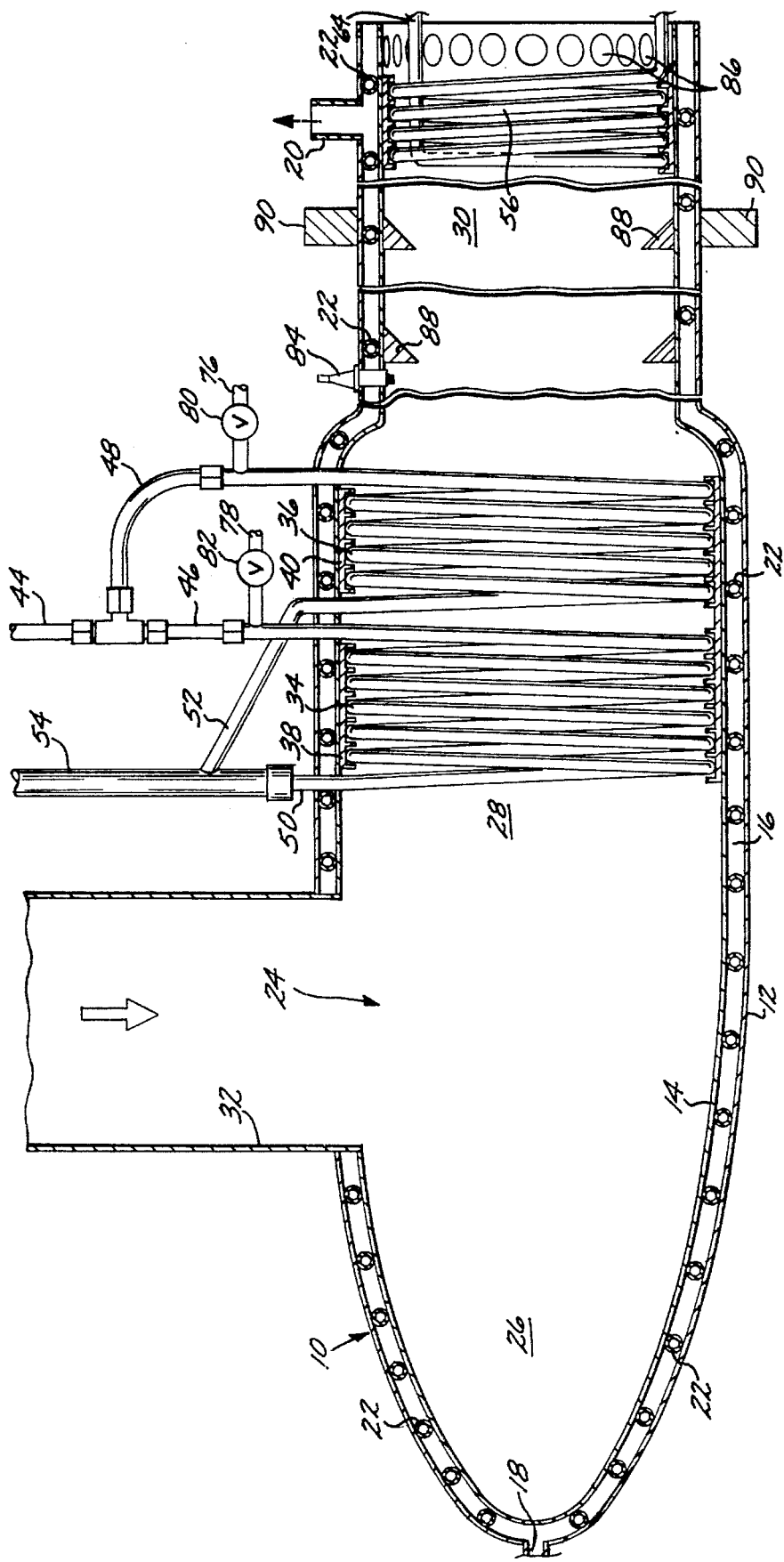
FIG. 6 is an enlarged view taken along the line 6—6 of FIG. 2.

Steam is injected into the preheated natural gas emanating from the heat exchangers 34 and 36 by connection of the steam lines 76 and 78 to the outlet ends of the heat exchanger coils, respectively, as best seen in FIGS. 1 and 6. The amount and temperature of the injected steam may vary according to the particular application.

The casing 10 is characterized by a curvilinear upstream end which enlarges to a maximum diameter in the middle region 28 that receives the fuel/air mixture from the fuel mixture inlet 32. The very turbulent flow in the upstream and middle regions 26 and 28 becomes more stable as it passes into the reduced diameter flame stabilizer or downstream region 30.

A spark plug or igniter 84 is mounted to the casing and projects into the region 30 for igniting the higher velocity stabilized gas mixture downstream from the heat exchangers 34 and 36. Initially the flame front moves into the upstream portions of the casing 10, and once ignited the combustion process stabilizes and the burned or exhaust gases pass out of the downstream end of the casing 10. The exhaust emissions pass over a plurality of circumferential openings 86 which have been provided in the end of the casing 10 to serve as a noise suppressor system. It has been found that this arrangement attenuates the burner noise to about 60 decibels.

The burning gases flowing through the downstream region 30 are directed tangentially in a swirling action to promote continued mixing of the fuel and air for complete combustion. This is accomplished by a plurality of vanes or fins 88 which are secured to the inner surface of the inner shell 14 along a spiral or helical path. The fins 88 project radially inwardly and are spaced apart and suitably tangentially arranged relative to the longitudinal axis of the casing 10 to impart the desired swirling.

A circumferential flange 90 surrounds the exterior of the outer shell casing 12 of the casing adjacent the downstream region 30 to facilitate attachment of the burner to the end application device, such as a steam generating boiler (not shown).

The burner includes an air intake means for accepting the preheated fuel and any injected steam. It utilizes the very high velocity flow of the fuel and steam to aspirate the air needed for complete combustion. The intake means includes structures whose positions are adjustable to adjust the precise amount of air that is needed.

More particularly, and as best seen in FIGS. 1–4, the intake means comprises a cylindrical nozzle housing 92 which is closed at the top, and which is open at the bottom to accept a cylindrical nozzle mount 94. The mount 94 is suitably secured in position by press fitting into the housing 92 or by attachment with suitable machine screws or the like (not shown).

Figure 4:
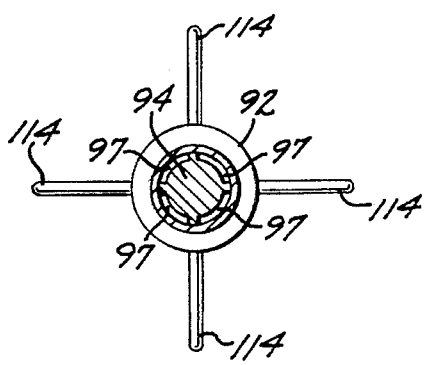
FIG. 4 is a view taken along the line 4—4 of FIG. 3.
Figure 5:
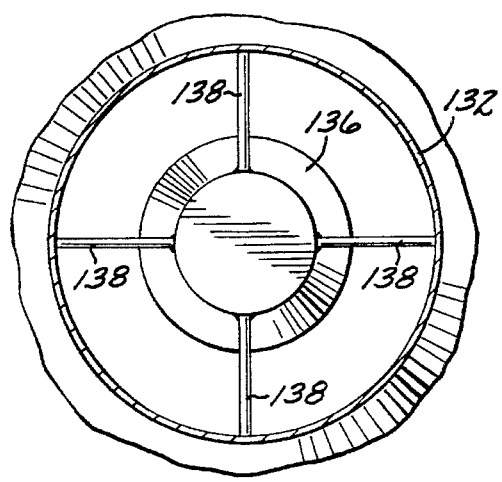
FIG. 5 is a view taken along the line 5—5 of FIG. 3.

The upper end of the mount 94 is spaced from the top of the housing 92 to define a steam chamber 96 for accepting steam from the steam line 66. The mount 94 includes four circumferentially spaced and axially extending lands which define steam passages 97 extending from the steam chamber 96 to the open lower end of the nozzle housing 92, as best seen in FIG. 4.

The fuel line 54 extends laterally through the adjacent wall of the nozzle housing 92, connecting with a lateral passage 98 provided in the nozzle mount 94. Fuel from line 54 can then flow, under the control of a valve 100, into the passage 98. The passage 98 is in communication with an axial or longitudinal passage 102 provided in the mount 94. The passage 102 in turn communicates with an aligned longitudinal passage 104 provided in a nozzle 106 so that the fuel can be discharged from the nozzle 106 at a greatly increased velocity.

Nozzle 106 is fitted within a suitable threaded opening provided in the lower end of the mount 94, being interchangeable with similarly threaded nozzles having different size passages 104. A passage size may be selected according to the air-fuel ratio desired for the particular application. Passages between 0.035 and 0.104 inches in diameter have been tested satisfactorily.

The nozzle housing 92 is slidably fitted within an annular band or ring 108. The vertical height of the housing 92 relative to the ring 108 is adjustably fixed by a plurality of circumferentially spaced apart set screws 110. These are threaded through suitable threaded openings in the ring 108 and frictionally bear against the housing 92 to hold it in place.

The nozzle housing 92 and associated structure are supported by a stabilizer or cage 112 which comprises four generally C-shaped arms 114 welded at their upper ends to the housing 92, and welded at their lower ends to a ring 116 which is larger in diameter, but otherwise similar to the ring 108.

The ring 108 includes four set screws 118 which extend through threaded openings in the ring 108 and bear against the cylindrical exterior of a first stage air intake 120. This adjustably fixes the intake 20 in position.

As evident from FIG. 3, the lower end of the nozzle 106 is located just above an upwardly and radially outwardly flared or concave throat 122 of the intake 120. This arrangement establishes a venturi effect as the rapidly flowing fuel is discharged by the nozzle 106 for entry into the throat 122. The linear momentum of the fuel causes air to be drawn or naturally aspirated into the intake 120.

The amount of air aspirated is a function of the height of the nozzle above the intake 120. This together with the location of other air intake structure enables establishment of a stoichiometric air to fuel ratio of approximately 15 to 1, and usually ratios in excess of that. Various air to fuel ratios can be established, as will be apparent. Insufficient air results in incomplete combustion, less heat, and the production of harmful pollutants, including nitrogen oxide and carbon monoxide. The levels of these pollutants should be kept below 30 ppm and 400 ppm, respectively, for the size of burner contemplated, i.e. about 2 to 5 million BTU per hour. On the other hand, too much air results in lower heat generation because the air tends to cool off the combustion reactions.

A second stage air intake 124 is supported by connection to the fuel mixture inlet 32, the inlet in turn being connected to the casing 10, as best seen in FIG. 1. Air intake 124 supports the first stage 120 by means of a cage 126 similar to the cage 112 of the first stage 120, the cage 126 including four arms 128 welded at their upper ends to the ring 116, and at their lower ends to the cylindrical upper portion of the second stage air intake 124.

The lower end of the first stage air intake 120 extends into the interior of the second stage air intake 124 to a point just below a concave throat 130 which is similar to the throat 122 of the intake 120.

The rapidly flowing discharge from the intake 120 aspirates further air into the intake 120 through the space defined between the lower end of the intake 120 and the throat 130.

The constant diameter upper portion of the intake 124 is connected at its bottom to an upper diffuser portion 132 which gradually increases in diameter, slowing the flow of the fuel and air mixture and inducing considerable turbulence. The portion 132 (which is foreshortened in FIG. 3 to conserve space) in turn merges with the upper end of a lower diffuser portion 134 which gradually decreases in diameter to speed the fuel/air flow and again induce turbulence for optimum mixing.

A mass flow diffuser 136 is located at the juncture of the upper and lower diffuser portions 132 and 134. It takes the form of a truncated cone having a smaller diameter the top and a larger diameter bottom.

The diffuser 136 is supported in position by four radially extending rods 138 which are attached at their inner ends to the diffuser 136 and at their outer ends to the adjacent wall of the lower diffuser portion 134. The fuel/air mixture is reduced in pressure in the portion 134, and further turbulent mixing takes place.

The velocity of the mixture increases as it passes from the portion 134 to a constant diameter restabilization portion 140 which is connected to the fuel mixture inlet 32.

Proper and intimate mixing of the fuel and air is vital to maintaining harmful pollutants in the exhaust emissions to an acceptable level. Incomplete combustion particularly results in high levels of unburned hydrocarbons and carbon monoxide.

In operation, the heat exchangers 34 and 36 preheat the natural gas fuel to thermal cracking temperatures, and the rapidly expanding fuel flows at high velocity, together with injected steam, through the nozzle 106. This greatly increases the velocity of flow of the fuel. Its linear momentum draws in or aspirates air sufficient to establish at least a stoichiometric mixture, and more commonly an excess air mixture in excess of the ideal 15 to 1 ratio. This tends to lower the combustion temperature below the level at which nitrogen oxide formation occurs and, together with the turbulent mixing of the fuel and air in the air intake system and in the combustion chamber, results in complete combustion and consequently low levels of carbon monoxide.

Various modifications and changes may be made with regard to the foregoing detailed description without depart-

What is claimed is:

1. A burner characterized by low pollutant emissions, the burner comprising:

an elongated casing having outer and inner shells and including a combustion chamber having upstream, middle and downstream regions, the casing further including a fuel mixture inlet for admitting a combustible mixture of fuel and air, the outer and inner shells being spaced apart to define an annular water jacket having a water inlet in the upstream region and a water outlet in the downstream region, the casing further including igniter means operative to ignite the mixture;

fuel preheater heat exchange means located in the middle region within the combustion chamber, and having a fuel inlet line to accept fuel from a fuel source and a fuel outlet line to discharge preheated fuel;

air intake means including nozzle means for accepting and further accelerating high velocity fuel from the fuel outlet line of the fuel preheater heat exchange means, and including air aspirator means operative to accept the high velocity fuel and aspirate air to form the combustible mixture, and further including conduit means connecting the air intake means to the fuel mixture inlet of the casing.

2. A burner according to claim 1 wherein the fuel preheater heat exchange means comprises a pair of adjacent heat exchangers, each in the form of a helical coil having one end coupled to the fuel source, and the other end coupled to the fuel outlet line.

3. A burner according to claim 1 and including steam injection means for selectively introducing steam into the fuel outlet line.

4. A burner according to claim 1 and including steam injection means for selectively introducing steam into the nozzle means.

5. A burner according to claim 3 wherein the steam injection means comprises a heat exchanger located in the downstream region of the casing and coupled to the fuel outlet line.

6. A burner according to claim 4 wherein the steam injection means comprises a heat exchanger located in the downstream region of the casing and coupled to the nozzle means.

7. A burner according to claim 1 wherein the nozzle means comprises a nozzle operative to accept fuel from the fuel outlet line and increase the velocity of fuel flow at the nozzle end from which the fuel is discharged, a nozzle housing carrying the nozzle and having a chamber and internal passages for accepting steam and directing it past the nozzle end.

8. A burner according to claim 1 including means for adjusting the relative location of the nozzle means and the air aspirator means.

9. A burner according to claim 1 wherein the air aspirator means comprises a first stage air intake having an enlarged entry throat adjacent the nozzle means for aspirating air into the first stage air intake utilizing the linear momentum of the fuel flowing into the first stage air intake.

10. A burner according to claim 9 and including a second stage air intake having an enlarged entry throat adjacent the discharge from the first stage air intake for aspirating air into the second stage air intake utilizing the linear momentum of the fuel and air mixture flowing out of the first stage air intake.

11. A burner according to claim 10 and including means for adjusting the location of the discharge end of the first stage air intake relative to the entry throat of the second stage air intake.

12. A burner according to claim 10 wherein the second stage air intake comprises a mass flow diffuser in the path of the fuel and air mixture flowing through the second stage air intake.

13. A burner according to claim 10 wherein the second stage air intake comprises portions having, successively in a downstream direction, a constant diameter portion, an increased diameter portion, a reduced diameter portion, and a constant diameter portion connected to the fuel mixture inlet of the casing, to promote turbulence and intimate mixing of the fuel and air.

14. A burner characterized by low pollutant emissions, the burner comprising:

an elongated casing having outer and inner shells and including a combustion chamber having upstream, middle and downstream regions, the casing further including a laterally oriented fuel mixture inlet for admitting a combustible mixture of fuel and air laterally into the upstream region to induce turbulence in the mixture as the mixture changes direction to flow downstream, the outer and inner shells being spaced apart to define an annular water jacket having a water inlet in the upstream region and a water outlet in the downstream region, the jacket including water directing means operative to swirl the water through the jacket as it flows downstream, the casing further including igniter means operative to ignite the mixture;

fuel preheater heat exchange means located in the middle region, and having a fuel inlet line to accept fuel from a fuel source and a fuel outlet line to discharge preheated fuel; and air intake means including nozzle means for accepting and further accelerating high velocity fuel from the fuel outlet line of the fuel preheater heat exchange means, and including air aspirator means operative to accept the high velocity fuel and aspirate air to form the combustible mixture, and further including conduit means connecting the air intake means to the fuel mixture inlet of the casing.

15. A burner according to claim 14 wherein the water directing means comprises a helically extending element disposed in the water jacket.

16. A burner according to claim 14 wherein the fuel preheater heat exchange means comprises a pair of adjacent heat exchangers, each in the form of a helical coil having one end coupled to the fuel source, and the other end coupled to the fuel outlet line.

17. A burner according to claim 14 and including steam injection means for selectively introducing steam into the fuel outlet line.

18. A burner according to claim 14 and including steam injection means for selectively introducing steam into the nozzle means.

19. A burner according to claim 17 wherein the steam injection means comprises a heat exchanger located in the downstream region of the casing and coupled to the fuel outlet line.

20. A burner according to claim 18 wherein the steam injection means comprises a heat exchanger located in the downstream region of the casing and coupled to the nozzle means.

21. A burner according to claim 14 and including a plurality of fins extending radially inwardly from the inner shell of the casing in the downstream region, and located and oriented to tangentially guide the burning gases in a swirling action to promote improved mixing and consequent complete combustion of the mixture of fuel and air.

22. A burner according to claim 14 and including a plurality of circumferentially arranged openings in the downstream extremity of the casing which open from the downstream region to atmosphere to attenuate the decibel level of the noise caused by passage of exhaust gases from the casing.

23. A burner according to claim 14 wherein the nozzle means comprises a nozzle operative to accept fuel from the fuel outlet line and increase the velocity of fuel flow at the nozzle end from which the fuel is discharged, a nozzle housing carrying the nozzle and having a chamber and internal passages for accepting steam and directing it past the nozzle end.

24. A burner according to claim 14 including means for adjusting the relative location of the nozzle means and the air aspirator means.

25. A burner according to claim 14 wherein the air aspirator means comprises a first stage air intake having an enlarged entry throat adjacent the nozzle means for aspirating air into the first stage air intake utilizing the linear momentum of the fuel flowing into the first stage air intake.

26. A burner according to claim 25 and including a second stage air intake having an enlarged entry throat adjacent the discharge from the first stage air intake for aspirating air into the second stage air intake utilizing the linear momentum of the fuel and air mixture flowing out of the first stage air intake.

27. A burner according to claim 26 and including means for adjusting the location of the discharge end of the first stage air intake relative to the entry throat of the second stage air intake.

28. A burner according to claim 26 wherein the second stage air intake comprises a mass flow diffuser in the path of the fuel and air mixture flowing through the second stage air intake.

29. A burner according to claim 26 wherein the second stage air intake comprises portions having, successively in a downstream direction, a constant diameter portion, an increased diameter portion, a reduced diameter portion, and a constant diameter portion connected to the fuel mixture inlet of the casing, to promote turbulence and intimate mixing of the fuel and air.

* * * * *